Jan. 8, 1935.  B. M. SHORT  1,986,859
TIRE COVER
Filed Dec. 14, 1931   2 Sheets-Sheet 1
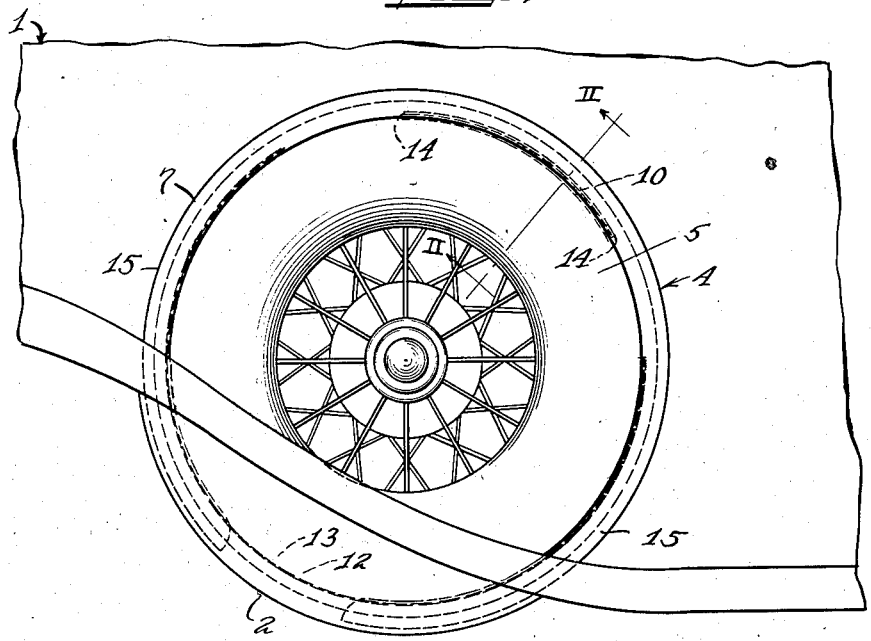
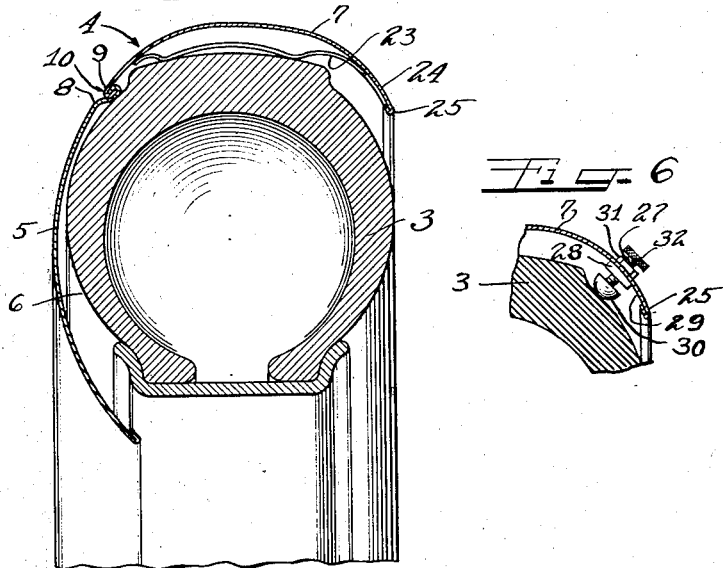
Inventor:
Bladen M. Short.

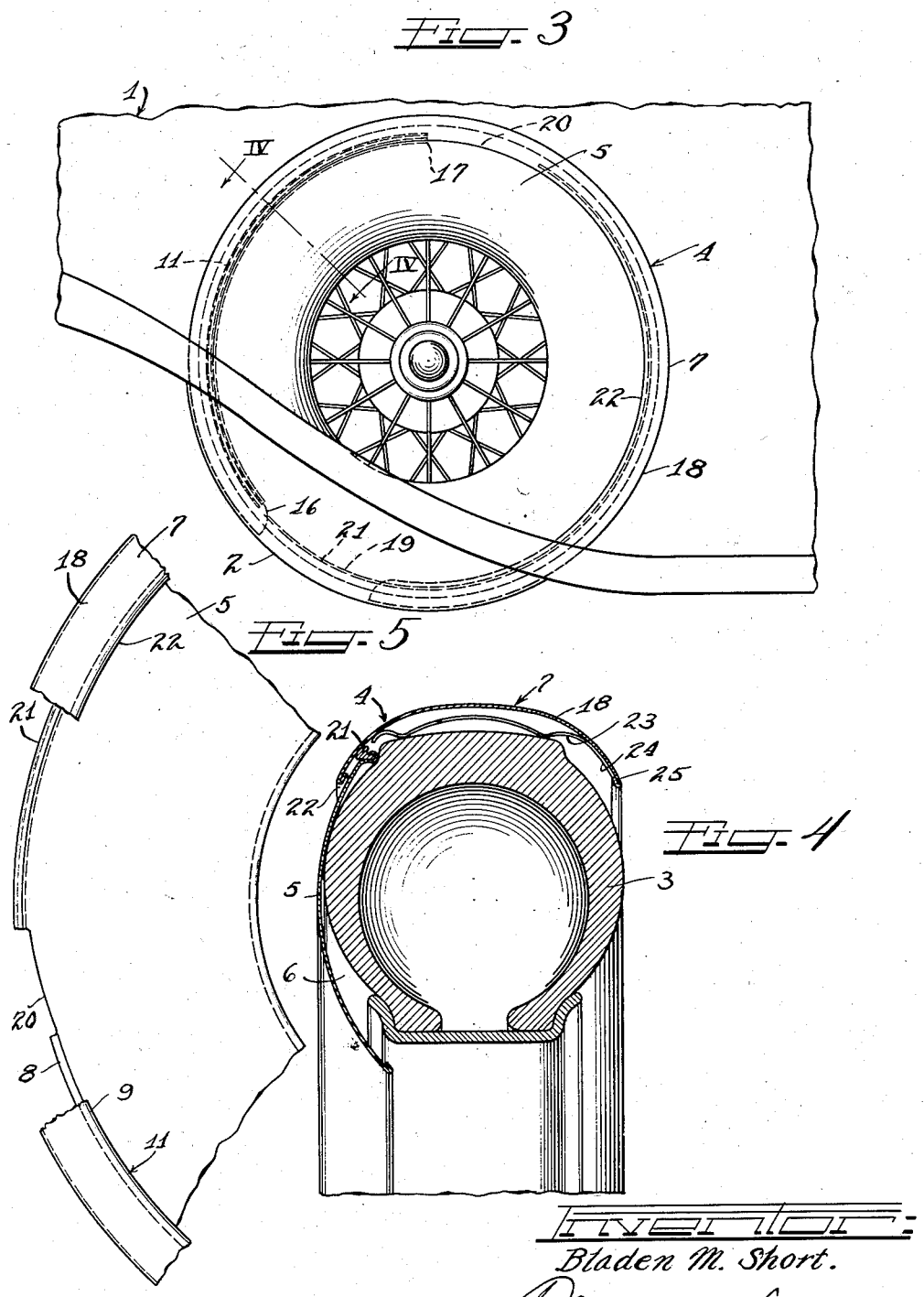

Patented Jan. 8, 1935

1,986,859

UNITED STATES PATENT OFFICE 1,986,859

TIRE COVER

Bladen M. Short, Detroit, Mich., assignor to Lyon Cover Company, Detroit, Mich., a corporation of Michigan Application December 14, 1931, Serial No. 580,776

4 Claims. (Cl. 150—54)

This invention relates to tire covers in general and in particular to tire covers for disposition about the spare tires carried in automobile fender wells and the like.

It is one of the objects of this invention to provide a unitary tire cover construction so formed as to be readily applicable to and removable from a tire, whether the latter be supported in a fender well or at the rear of a motor vehicle or elsewhere.

Another object of the invention is to provide a substantially unitary tire cover having relatively movable parts by which one may be enabled to readily apply a cover to and remove the same from a proper covering relation to a tire.

It is a further object of the invention to provide a unitary tire cover embodying self-adjusting or mechanical adjusting means for adjusting the cover to different sizes of tires and tire treads.

In carrying out the invention in practice, a side plate for covering a side wall of a tire and a split ring member for covering the tread of a tire are brought together, a portion of one longitudinal edge of the split ring member being lock seamed or otherwise permanently secured to a corresponding portion of the outer peripheral edge of the side plate, preferably so arranged that at least one end of the split ring member is free to be swung outwardly a substantial amount about the lock seamed portion as a pivot. This will enable one to easily remove the cover from and apply the same to a tire. Cushioning means is preferably provided between the free end or ends of the ring member and the juxtaposed portion or portions of the plate to inhibit rattling, the free end or ends of the ring member normally pressing resiliently against the cushioning means.

Suitable adjusting means will preferably be employed to adapt the covers to different sizes of tires and treads.

Further objects and advantages of the invention will appear as the description proceeds.

This invention is illustrated in the drawings and hereinafter more fully described.

On the drawings:

Figure 1 is a fragmentary elevational view of a portion of an automobile showing a fender and a tire cover constructed in accordance with the principles of the present invention applied to a tire carried in the well.

Figure 2 is an enlarged fragmentary sectional view taken approximately in the plane indicated by the line II—II in Figure 1.

Figure 3 is a view similar to Figure 1 but showing a modified form of the invention.

Figure 4 is an enlarged fragmentary sectional view taken approximately in the plane indicated by the line IV—IV in Figure 3.

Figure 5 is an enlarged fragmentary elevational view, partly broken away, showing the cooperating marginal portions of the side plate and outer ring of the tire cover.

Figure 6 is a fragmentary sectional view of a modified form of adjusting means for the cover.

Referring now more particularly to the drawings, wherein the same parts are designated throughout by the same reference characters, an automobile shown fragmentarily at 1 is provided with a fender well 2 in which a spare tire 3 having the major portion of its surface concealed by a tire cover 4 is supported. The tire cover 4 comprises an annular side plate 5 preferably transversely arcuate to enhance the appearance of the cover as a whole and also to conform more or less to the transverse curvature of the side wall 6 of the tire 3 to conceal the same. The cover 4 also includes a preferably transversely arcuate rim part or tread concealing portion in the form of a split ring 7 which, together with the plate 5 is formed to conceal that portion of the tire which projects above the fender well 2 and which includes the tread and the wall facing away from the body of the vehicle 1.

To facilitate the application and removal of the cover 4, the parts 5 and 7 are united at overlapping margins 8 and 9 thereof along an intermediate portion of the rim part 7 as shown at 10 in the form of the invention appearing in Figure 1, or along one side of the rim part to an end thereof as shown at 11 in the form of the invention appearing in Figure 3.

Regarding Figure 1, the major outer marginal portion 12 of the side plate 5 has secured thereto a rubber or like cushioning bead 13 extending just short of the ends 14 of the lock seam or like uniting means 10. The corresponding end portions 15 of the rim part 7 are free to flex about the locked section 10, and by reason of the resilient property of the material of which the part 7 is made, the section 10 constitutes in effect a hinge for the end portions 15. The portions 15 are formed to overlap the outer peripheral margin 12 of the side plate 5 and normally engages the rubber or like bead 13. It will thus become evident that by flexing the free end portions 15 outwardly, the cover 4 may be readily applied to and removed from a tire.

In the form of the invention shown in Figure 3, the uniting means, which may be a lock seam 11 or otherwise, extends from one end 16 of the rim part 7 along an arc which is preferably not in excess of 180°, and terminates at 17, the remaining portion 18 of the part 7 being free to flex about the terminal 17. The remaining portion of the outer periphery 19 of the side plate 5 (Figure 3), except for a short arc 20, is formed with a rubber or like cushioning bead 21, normally engageable with the corresponding overlapping portion 22 of the free tread concealing part 7.

The member 7 is preferably made of resilient material, such as metal, compressively engages the bead 21 to prevent rattling, and is capable of outward flexure with respect to the terminal 17 of the lock seam 11 whereby the cover as a whole may be readily removed from or applied to the tire 3.

In both forms of the invention, the transverse curvature of the cooperating marginal portions of the side plate 5 and rim part 7 is substantially the same, so that in use the cover as a whole has the appearance of an integral member which is transversely continuous which greatly enhances the esthetic effect of the cover and the automobile in connection with which it is used.

By virtue of varying degrees of inflation of the same tire, and of the different sizes which are inherent in the same tire because of different degrees of wear to which the same have been subjected, and further in view of the fact that, for a given size wheel, tire treads and sizes vary, the tire cover embodying the principles of the present invention is provided with means whereby the same may be effectively adapted to the spare tire of a car, regardless of the condition or shape or size thereof. To this end, in accordance with one form of the invention, one or more spring elements 23 are welded or otherwise secured at 24 to the rear marginal portion 25 of the rim part 7 and extend preferably transversely of the tread of the tire. Each spring element 23 moreover normally extends radially inwardly of the rim part 7 to a sufficient extent to insure its engagement with the tread of the tire with some pressure as shown for example in Figures 2 and 4.

It will be seen from the foregoing that I have provided a unitary tire cover which may be readily applied to and removed from tires within a certain size range, and provided with means for securely holding the same detachably upon the tire, which has a pleasing appearance and gives the vehicle in connection with which it is used a "dressed up" look, and is capable of use with any spare tire, regardless whether the same be mounted in a fender well or on a tire carrier at the rear of an automobile or elsewhere. The natural resilience of the rim part 7 insures against rattling of the same when mounted on a tire in a fender well as shown in Figures 1 and 3, and this property is enhanced when spring elements such as those designated 23 in the drawings are employed.

If desired, instead of automatically adjusting the cover for tires of different shapes and sizes by means of spring elements 23, such adjustment could be taken care of manually by the use of buttons 26, one of which is shown in Figure 6. Any number of buttons 26 may be provided in spaced relation circumferentially along the free margin 25 of the rim part 7, and each will preferably comprise a threaded shank 27 passing through an internally threaded member 28, secured by welding or otherwise to the inner side 29 of the marginal portion 25 of the rim part 7, and a tire engaging head 30. The shank 27 projects beyond the outer side of the rim part 7, a nut 31 being provided to firmly hold the head 30 of the button in the desired position of adjustment. A knurled or like hand grip 32 secured to the outer end of the shank 29 is provided to facilitate adjustment of the button.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A multi-part tire cover for protecting a spare tire, including a metal part for covering the side of the tire and a split circular rim part formed to extend about more than one-half of the periphery of the tire and cooperating with said metal part to hold the same in proper tire protecting position on the tire, said two parts including a connection between them embodying a seam uniting one end of the rim part to an outer peripheral portion of the metal part for securing said parts together in such a manner that the rim part may be pivotally moved relative to the other part in the application or removal of the cover to and from the tire.

2. A multi-part tire cover for protecting a spare tire, including a metal part for covering the side of the tire and a split circular rim part formed to extend about more than one-half of the periphery of the tire and cooperating with said metal part to hold the same in proper tire protecting position on the tire, said two parts including a connection between them embodying a seam uniting one end of the rim part to an outer peripheral portion of the metal part for securing said parts together in such a manner that the rim part may be pivotally moved relative to the other part in the application or removal of the cover to and from the tire, and cushioning means spacing the unsecured portion of the rim part from the metal part.

3. A multi-part tire cover for protecting a spare tire, including a metal part for covering the side of the tire and a split circular rim part formed to extend about more than one-half of the periphery of the tire and cooperating with said metal part to hold the same in proper tire protecting position on the tire, said two parts including a connection between them embodying a lock seam uniting one end of the rim part to an outer peripheral portion of the metal part for securing said parts together in such a manner that the rim part may be pivotally moved relative to the other part in the application or removal of the cover to and from the tire, and yieldable tire engaging means associated with said cover for holding the latter on tires of various sizes.

4. A multi-part tire cover for protecting a spare tire, including a metal part for covering the side of the tire and a split circular rim part formed to extend about more than one-half of the periphery of the tire and cooperating with said metal part to hold the same in proper tire protecting position on the tire, said two parts including a connection between them embodying a lock seam uniting one end of the rim part to an outer peripheral portion of the metal part for securing said parts together in such a manner that the rim part may be pivotally moved relative to the other part in the application or removal of the cover to and from the tire, and adjustable tire engaging means associated with said cover for holding the latter on tires of various sizes.

BLADEN M. SHORT.